United States Patent
Bradshaw (10) Patent No.: US 8,488,518 B2
(45) Date of Patent: Jul. 16, 2013

(54) METHOD AND SYSTEM FOR SYNCHRONISING STATIONS WITHIN COMMUNICATIONS NETWORKS AND STATIONS FOR USE THEREIN

(75) Inventor: Phillip Bradshaw, Western Australia (AU)

(73) Assignee: Barrett Communication Pty., Ltd., Bibra Lake, Western Australia ( * ) Notice: Subject to any disclaimer, the term of this patent is extended or adjusted under 35 U.S.C. 154(b) by 1492 days.

(21) Appl. No.: 10/567,110

(22) PCT Filed: Jun. 30, 2004

(86) PCT No.: PCT/AU2004/000875
§ 371 (c)(1),
(2), (4) Date: Sep. 18, 2009

(87) PCT Pub. No.: WO2005/013510
PCT Pub. Date: Feb. 10, 2005

(65) Prior Publication Data
US 2011/0122980 A1    May 26, 2011

(30) Foreign Application Priority Data
Aug. 4, 2003   (AU) .............................. 2003904339

(51) Int. Cl.
  *H04B 7/212* (2006.01)
  *H04B 1/00* (2006.01)
  *H04W 4/00* (2009.01)
  *H04J 3/06* (2006.01)
(52) U.S. Cl.
  USPC ........... 370/324; 370/330; 370/350; 370/503; 375/133

(58) Field of Classification Search
  USPC ................. 370/310–350, 203–211, 498–529; 375/132–149
  See application file for complete search history.

(56) References Cited

U.S. PATENT DOCUMENTS 4,435,821 A * 3/1984 Ito et al. ........................ 375/137
4,479,226 A  10/1984 Prabhu et al.

(Continued)

FOREIGN PATENT DOCUMENTS

EP   0 806 845 A2   11/1997
GB   2 306 856 A    5/1997

(Continued)

OTHER PUBLICATIONS

International Search Report.

*Primary Examiner* — Tri H Phan
(74) *Attorney, Agent, or Firm* — Vedder Price P.C.; Thomas J. Kowalski; Rebecca G. Rudich (57) ABSTRACT

A system for synchronizing stations in a communications network comprising: at least one airborne or space-based vehicle; and at least two stations, each station having receiver means in data communication with the at least one airborne or space-based vehicle and control means in data communication with the receiver means and in control communication with a communication means. When each receiver means receives a synchronization signal from the at least one airborne or space-based vehicle each receiver means forwards the synchronization signal to its respective control means. The respective control means processes the synchronization signal to determine the operational frequency required by its respective communication means to maintain or establish communication with the other station. The respective control means also operates to control its respective communication means to change to the determined operational frequency.

56 Claims, 3 Drawing Sheets

U.S. PATENT DOCUMENTS

| | | | |
|---|---|---|---|
| 5,235,613 A | | 8/1993 | Brown et al. |
| 5,506,863 A | | 4/1996 | Meidan et al. |
| 5,510,797 A | | 4/1996 | Abraham et al. |
| 5,583,517 A | * | 12/1996 | Yokev et al. ............... 342/457 |
| 5,638,361 A | * | 6/1997 | Ohlson et al. ............... 370/342 |
| 5,642,285 A | | 6/1997 | Woo et al. |
| 5,790,939 A | * | 8/1998 | Malcolm et al. ............ 455/13.2 |
| 5,870,426 A | | 2/1999 | Yokev et al. |
| 5,875,182 A | | 2/1999 | Hatzipapafotiou ........... 370/321 |
| 6,049,561 A | | 4/2000 | Pezzlo et al. |
| 6,308,280 B1 | * | 10/2001 | Joseph et al. ............... 713/400 |
| 6,724,737 B1 | * | 4/2004 | Boyden et al. .............. 370/316 |
| 6,865,238 B2 | * | 3/2005 | Friedman ..................... 375/295 |
| 7,480,324 B2 | * | 1/2009 | Aiello et al. ................. 375/130 |
| 7,711,480 B2 | * | 5/2010 | Robbins ....................... 701/471 |
| 8,130,141 B2 | * | 3/2012 | Pattabiraman et al. .. 342/357.29 |
| 2002/0172309 A1 | | 11/2002 | Cheng |
| 2003/0222814 A1 | * | 12/2003 | Sanchez Gomez ...... 342/357.01 |
| 2004/0204850 A1 | * | 10/2004 | MacNeille et al. ........... 701/213 |
| 2005/0259001 A1 | * | 11/2005 | Sanchez Gomez ...... 342/357.01 |

FOREIGN PATENT DOCUMENTS

| | | |
|---|---|---|
| WO | WO 96/24992 | 8/1996 |
| WO | WO 98/49780 | 11/1998 |
| WO | WO 01/24427 | 4/2001 |
| WO | WO 03/007580 | 1/2003 |

* cited by examiner

METHOD AND SYSTEM FOR SYNCHRONISING STATIONS WITHIN COMMUNICATIONS NETWORKS AND STATIONS FOR USE THEREIN

FIELD OF THE INVENTION

The present invention relates to a method and system for synchronising communications networks and stations for use therein. The invention is particularly suitable for synchronisation of high frequency single sideband ("HF SSB") frequency hopping and scanning communication systems and also enables real-time automatic link establishment.

BACKGROUND ART

The following discussion of the background of the invention is intended to facilitate an understanding of the present invention. However, it should be appreciated that the discussion is not an acknowledgement or admission that any of the material referred to was published, known or part of the common general knowledge in any jurisdiction as at the priority date of the application.

HF SSB frequency hopping networks change operating frequencies several times per second. In order to ensure that communication is maintained between senders and receivers, all stations must be synchronised so that they change to the same frequency at the same time (a process commonly referred to as "hopping").

One method of synchronising communications between land-based senders and land-based receivers in a HF SSB frequency hopping network is to designate a sender as a master station. The master station sends synchronisation data to the receivers via several frequencies within the hopping channel. The receivers process the synchronisation data to determine the time of the next change and the frequency range of the next hopping channel.

The problem with this method of synchronisation is that if the synchronisation data is not received by a receiver or an incomplete set of synchronisation data is received, the receiver is most likely to lose communication with the master station (or fail to establish communication if the missed or incomplete synchronisation data has been sent in order to initiate communication between senders and receivers). The receiver must then wait until the master station again transmits synchronisation data on frequencies within the hopping channel used prior to loss of communication before it can re-establish communication. This delay before re-establishing communication can be a significant period of time and may result in degradation or loss of communication at a critical time.

This problem is further exacerbated when it is considered that the synchronisation data may be lost due to reasons such as signal path propagation failure and local noise or other interference.

Another method of synchronising communications between land-based senders and land-based receivers utilises both frequency scanning systems and selective calling systems. Frequency scanning systems that also utilise selective calling systems operate as follows.

All stations in the communications network scan, and receive, frequencies throughout the High Frequency spectrum that they are allocated to use. A station wishing to call another station selects a frequency and sends a selective call signal addressed to the station it wishes to call. If the recipient station hears the calling station it sends a return signal to the calling station indicating the signal quality of the selected frequency. If the calling station does not receive a return signal, or the signal quality described by the return signal is not sufficient for the proposed communication, the calling station selects another frequency and repeats the process. This continues until a suitable frequency is found.

The problem with this synchronisation method is that there may be a significant delay before an acceptable return signal is received from the recipient station and this delay may result in a loss of communication at a critical time.

Another method of synchronising communications between land-based senders and land-based receivers utilises both frequency scanning systems and Automatic Link Establishment ("ALE") (described in FED-STD-1045). Frequency scanning systems that also utilise ALE operate as follows.

All stations in the communications network scan, and receive, frequencies throughout the High Frequency spectrum that they are allocated to use. Each station also transmits a "sounding" signal consisting of the stations address and a bit stream. This "sounding" signal is transmitted at random intervals and on a frequency also chosen at random. Other stations receive the "sounding" signal and record details based on the "sounding" signal. A Link Quality Analysis value is also allocated to the transmitting station based on the "sounding" signal. The details, and their corresponding Link Quality Analysis value, are converted to records in a database. The database represents stations that have been "heard" on particular frequencies, their signal quality and the time when the station was "heard".

When one station wishes to call another station, the transmitting station searches its database for records on the receiving station. These records are then compared to the current time to determine the best frequency to use for establishing communication with the receiving station. The transmitting station and receiving station then communicate using the determined frequency.

The problems involved with this synchronisation method are:

A significant delay may be encountered at startup of the network as all stations in the communications network need to be registered on each station within the network's database. Thus, initial communication between stations in the network must involve "sounding" signals; and The on-air "sounding" process uses network communication air-time and whilst in progress could impede normal voice communications for which the network is intended.

DISCLOSURE OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

In accordance with a first aspect of the present invention there is provided a station for use in a communications network including at least one airborne or space-based vehicle, the station comprising:

receiver means in data communication with the at least one airborne or space-based vehicle; and control means in data communication with the receiver means and in control communication with a communication means;

wherein, when the receiver means receives a synchronisation signal from the at least one airborne or space-based vehicle:

the receiver means forwards the synchronisation signal to the control means;

the control means processes the synchronisation signal to determine the operational frequency range required by the communication means to maintain or establish communications with another station; and the control means controls the communication means to change to the determined operational frequency range.

Preferably, the synchronisation signal is a time code and processing the synchronisation signal comprises synchronising a real-time clock according to the value of the time code and using at least one time pulse emitted by the real-time clock within an interval to execute an algorithm to determine the frequency range of the communication means needed to maintain or establish communications.

More preferably, the algorithm to determine the operational frequency range of the communication means consists of generating a pseudo-random number using Digital Encryption Standard technology and cross-referencing this number with a frequency table.

Alternatively, the algorithm to determine the operational frequency range of the communication means consists of cross-referencing the time as recorded by the real-time clock with a frequency table.

Preferably, the communications means is a transceiver.

Alternatively, the communications means is a transmitter.

Alternatively, the communications means is a receiver.

In accordance with a second aspect of the present invention there is provided a system for synchronising a communications network comprising:

at least one airborne or space-based vehicle;

at least two stations as described in the first aspect of the present invention, the receiver means of each being in data communication with the at least one airborne or space-based vehicle;

wherein when the receiver means of each station receives a synchronisation signal from the at least one airborne or space-based vehicle:

the receiver means forwards the synchronisation signal to its respective control means;

the respective control means processes the synchronisation signal to determine the operational frequency range of the communication means needed to maintain or establish communications; and the respective control means controls the respective communication means to change to the determined operational frequency range;

and wherein the communications means of each station are then operable to allow communication to pass there between.

Preferably, the at least one airborne or space-based vehicle is an orbiting or geosynchronous satellite.

More preferably, the at least one airborne or space-based vehicle is the global positioning system network of orbiting or geosynchronous satellites.

Preferably, the synchronisation signal is a time code.

More preferably, processing the synchronisation signal at each station comprises synchronising the real-time clock of the station according to the value of the time code and using at least one time pulse emitted by the real-time clock within an interval to execute an algorithm to determine the operational frequency range of the communication means needed to maintain or establish communications.

More preferably, the algorithm to determine the operational frequency range of the communication means consists of generating a pseudo-random number using Digital Encryption Standard technology and cross-referencing this number with a frequency table.

Alternatively, the algorithm to determine the operational frequency range of the communication means consists of cross-referencing the time as recorded by the real-time clock with a frequency table.

Preferably, the communication means of one or more stations is a transceiver.

Alternatively, the communication means of at least one station is a transmitter and the communication means of at least one other station is a receiver.

In accordance with a third aspect of the present invention there is provided a method for synchronising communication networks comprising:

receiving a synchronisation signal from at least one airborne or space-based vehicle;

processing the synchronisation signal to determine the operational frequency range a communication means needs to operate at to establish or maintain communications; and changing the operational frequency range of the communication means to the determined operational frequency range.

Preferably, the step of processing the synchronisation signal further comprises the steps of:

synchronising a real-time clock according to the value of the synchronisation signal;

determining the operational frequency range the communication means needs to operate at to establish or maintain communications based on at least one time pulse emitted by the real-time clock during an interval.

More preferably, the step of determining the operational frequency range involves executing an algorithm that generates a pseudo-random number using Digital Encryption Standard technology and cross-referencing this number with a frequency table.

Alternatively, the step of determining the operational frequency range involves cross-referencing the time as recorded by the real-time clock with a frequency table.

Preferably, the method further comprises the steps of:

transmitting a signal on at least one frequency within the operational frequency range to a destination station in accordance with the first aspect of the present invention;

analysing each signal received by the destination station to determine the frequency within the operational frequency range to communicate on; and receiving an acknowledgment signal from the destination station on the frequency determined for communications.

More preferably, the step of analysing each signal received by the destination station comprises subjecting each signal to a bit error rate analysis and the frequency to communicate on is determined by the signal with the lowest bit error rate.

Alternatively, the step of analysing each signal received by the destination station comprises subjecting each signal to a signal strength analysis and the frequency to communicate on is determined by the signal with the strongest signal strength.

In a further alternative, the step of analysing each signal received by the destination station comprises subjecting each signal to a bit error rate analysis and signal strength analysis and the frequency to communicate on is determined by the combined results of these analyses.

In such a situation, the signal with the lowest bit error rate may not necessarily be the frequency to communicate on due to a weaker signal strength and the signal with the strongest signal strength may not necessarily be the frequency to communicate on due to a high bit error rate.

BRIEF DESCRIPTION OF THE DRAWINGS

Embodiments of the present invention will now be described, by way of example only, with reference to the accompanying drawings, in which.

BEST MODE(S) FOR CARRYING OUT THE INVENTION

Figure 1:
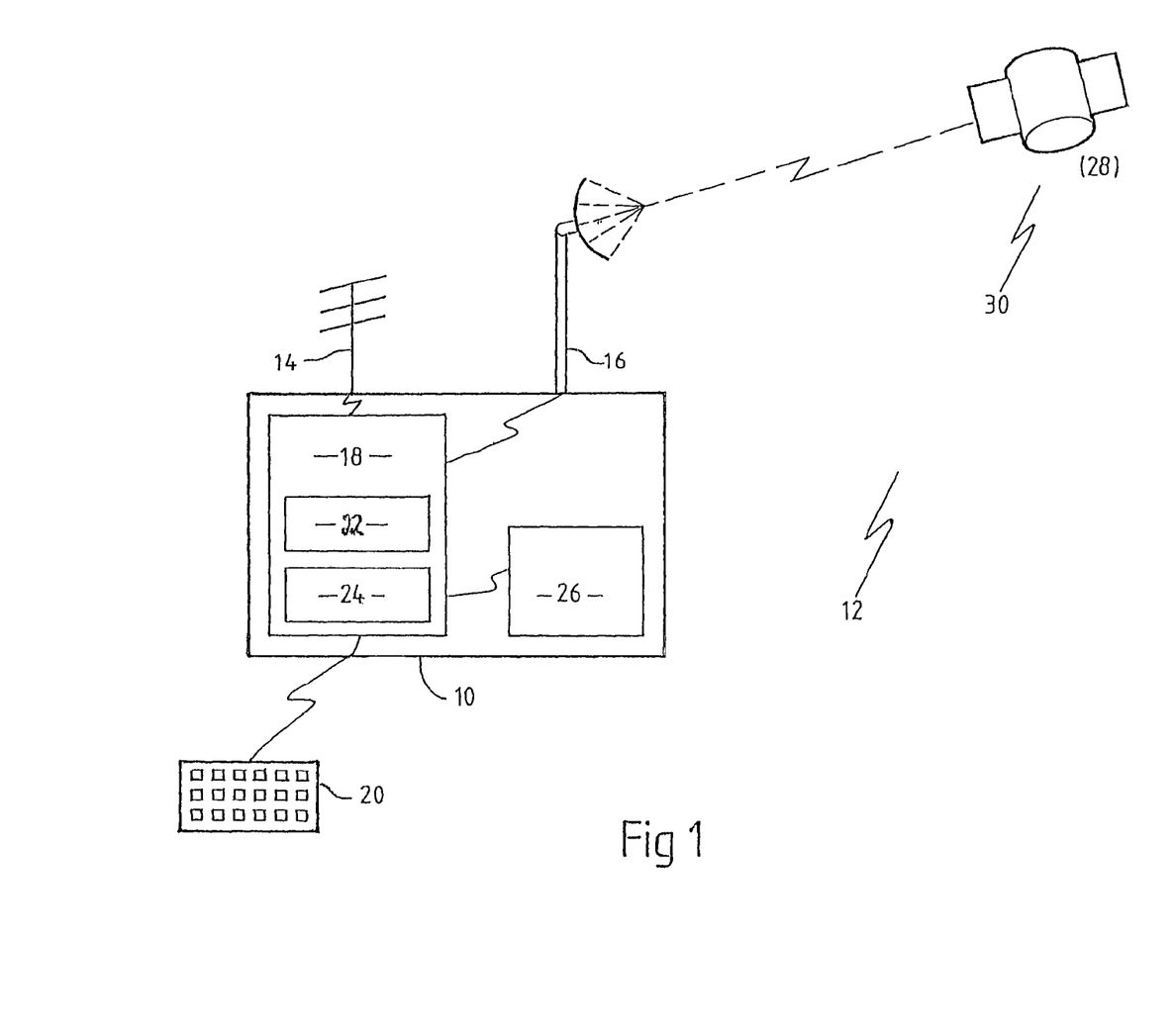
FIG. 1 is a schematic view of a communications network in accordance with a first embodiment of the present invention.

In accordance with a first embodiment of the present invention as shown in FIG. 1 there is provided a station 10 for use in a HF SSB network 12.

The station 10 comprises a HF transceiver 14 in data and command communication with a Global Positioning System ("GPS") receiver 16. Both the transceiver 14 and the GPS receiver 16 are in data and command communication with a microprocessor 18. The microprocessor 18 is also in data communication with a keypad 20.

Microprocessor 18 is pre-programmed with a Digital Encryption Standard ("DES") algorithm 22 and frequency tables 24. The microprocessor 18 is coupled to a system clock 26.

In use, the station 10 operates as follows.

GPS receiver 16 constantly receives a time and position sentence broadcast from a satellite 28 in the GPS network of satellites 30. The time and position sentence is broadcast in digital form. The digital time and position sentence is then communicated to microprocessor 18 for processing. The microprocessor 18 parses the time and position sentence to determine the time of the 1 second timing pulse that immediately precedes the time and position sentence. The rising edge of the 1 second timing pulse is then used to synchronise the system clock 26. Thus, the system clock 26 is calibrated every second to a high degree of accuracy as provided by the satellite 28.

Prior to use, an operator enters in a DES "key" via the keypad 20. The keypad 20 forwards the DES "key" to the microprocessor 20. The microprocessor 20 then operates to seed the DES algorithm 22 with the DES "key".

With the DES algorithm 22 seeded with the DES "key", the DES algorithm 22 produces a frequency control command several times a second, as determined by a timing pulse of the system clock 26. The frequency control command is formed by cross-referencing the pseudo-random output of the seeded DES algorithm 22 with frequency tables 24. The frequency control command includes details of the next frequency that will be used to continue the communication.

The frequency control command is then forwarded to HF transceiver 14. The HF transceiver 14 then acts in accordance with the frequency control command to change its transmission and receiving frequency to that of the frequency stated in the frequency control command.

It should be noted that the DES "key" is distributed to all stations 10 within the HF SSB network 12 by the network control person and can be changed on a daily basis or as required to increase security. Further, as the inputted DES "key", the frequency table and the time portion of the time and position sentence received from satellite 28 are the same at all stations 10, the frequency that each station 10 transmits and receives on is the same as that of every other station in the HF SSB network 12.

Additionally, while the output of the DES algorithm 22 is described as pseudo-random, the number of outputs (and thus frequency control commands issued to the HF transceiver 14) that are produced before a duplicate arises is such as to be practically random. This makes it extremely difficult for stations 10 not part of the HF SSB network 12 to monitor the HF SSB network 12.

Figure 2:
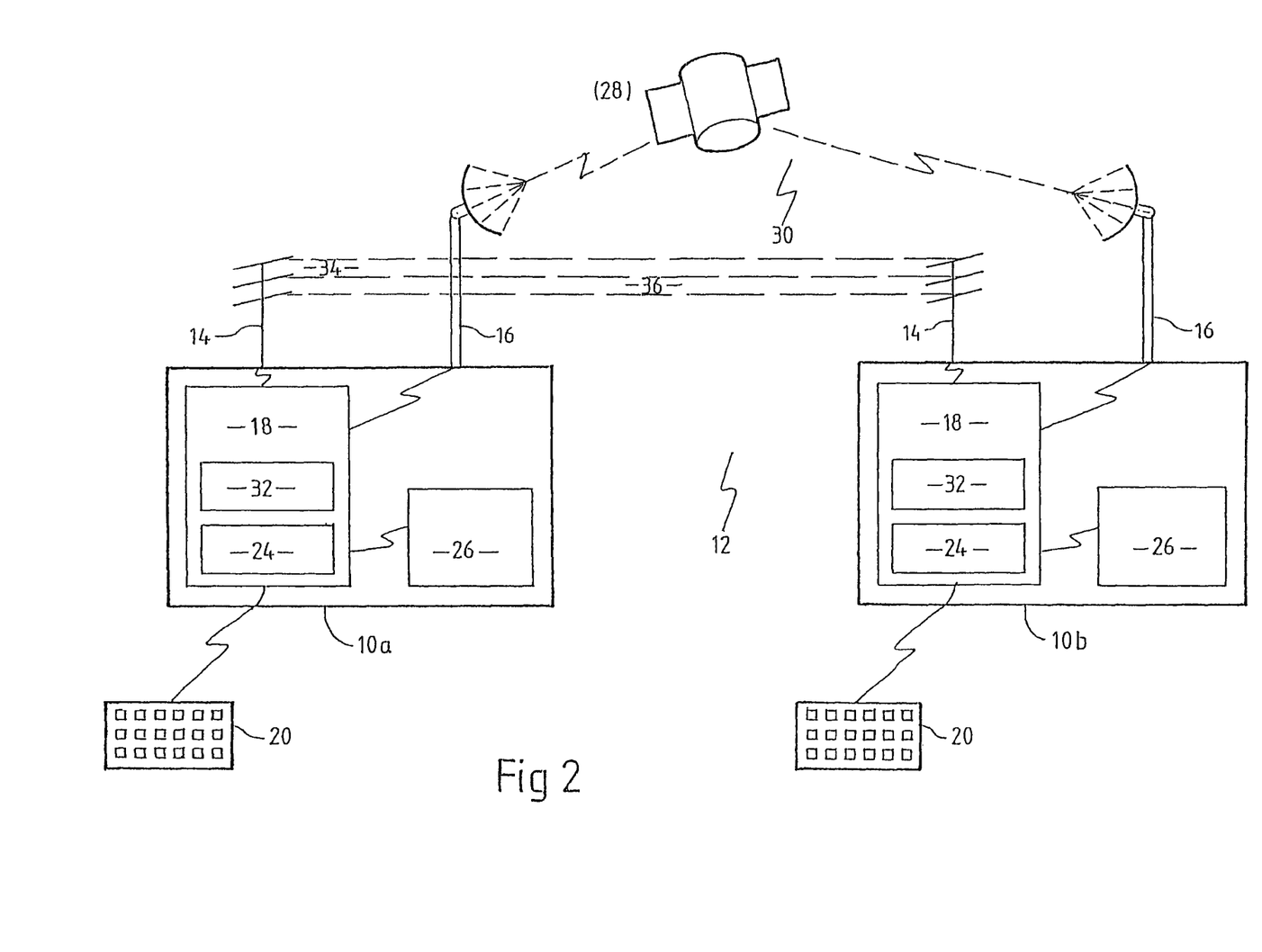
FIG. 2 is a schematic view of a communications network in accordance with a second embodiment of the present invention.

In accordance with a second embodiment of the present invention, as shown in FIG. 2 where like numerals reference like parts, there is provided a station 10 for use in a HF SSB network 12.

The station 10 comprises a HF transceiver 14 in data and command communication with a GPS receiver 16. Both the transceiver 14 and the GPS receiver 16 are in data and command communication with a microprocessor 18. The microprocessor 18 is also in data communication with a keypad 20.

Microprocessor 18 is pre-programmed with a communications algorithm 32 and frequency tables 24. The microprocessor 18 is coupled to a system clock 26.

In use, the station 10 operates as follows.

GPS receiver 16 constantly receives a time and position sentence broadcast from a satellite 28 in the GPS network of satellites 30. The time and position sentence is broadcast in digital form. The digital time and position sentence is then communicated to microprocessor 18 for processing. The microprocessor 18 parses the time and position sentence to determine the time of the 1 second timing pulse that immediately precedes the time and position sentence. The rising edge of the 1 second timing pulse is then used to synchronise the system clock 26. Thus, the system clock 26 is calibrated every second to a high degree of accuracy as provided by the satellite 28.

Several times a second, as determined by a timing pulse of the system clock 26, the communications algorithm 32 produces a frequency control command. The frequency control command instructs the HF transceiver to move to a new frequency recorded in the frequency tables 24.

Further, as each station 10 in the HF SSB network 12 use the same frequency tables 24 and the same communications algorithm 32, all transceivers will scan through each frequency recorded in the frequency tables 24 at the same time.

While this constant scanning process occurs, if a station 10a wants to communicate with another station 10b in the HF SSB network 12, the operator of the first station 10a (the "calling station") enters in the code of the second station 10b (the "receiving station") via keypad 20. The inputting of a code of a receiving station 10b via keypad 20 initiates the execution of a calling sequence 34.

The calling sequence 34 is created by generating a Frequency Shift Keying (FSK) or Phase Shift based signal 36 that contains the code of the calling station 10a and the code of the receiving station 10b. The calling sequence 34 then continues with signal 36 being transmitted by HF transceiver 14 on each frequency recorded in the frequency tables 24 twice, cycling through each frequency recorded in the frequency tables 24 before retransmitting the signal 36 on the same frequency.

As mentioned above, periodically each station 10 scans through each frequency recorded in the frequency tables 24. Thus, each station 10 will receive the signal 36 across a range of frequencies. However, only the receiving station 10b, as determined by the code of the receiving station 10b that forms part of the signal 36, will record the frequency at which the calling station's 10a signal 36 was received with the best signal strength or Bit Error Rate.

When the calling station 10a completes execution of the calling sequence 34 it continues scanning for an acknowledgement signal. At the same time the receiving station 10b stops scanning and sends an acknowledgement signal back to the calling station 10a (as identified by the code of the calling station 10a embedded in signal 36) on the frequency recorded as described in the last paragraph.

Once the calling station 10a receives an acknowledgement signal it stops scanning. Communication then proceeds on the frequency the acknowledgement signal was sent on. When communication between the calling station 10a and receiving station 10b ceases, both stations return to scanning in accordance with their respective frequency control commands.

Figure 3:
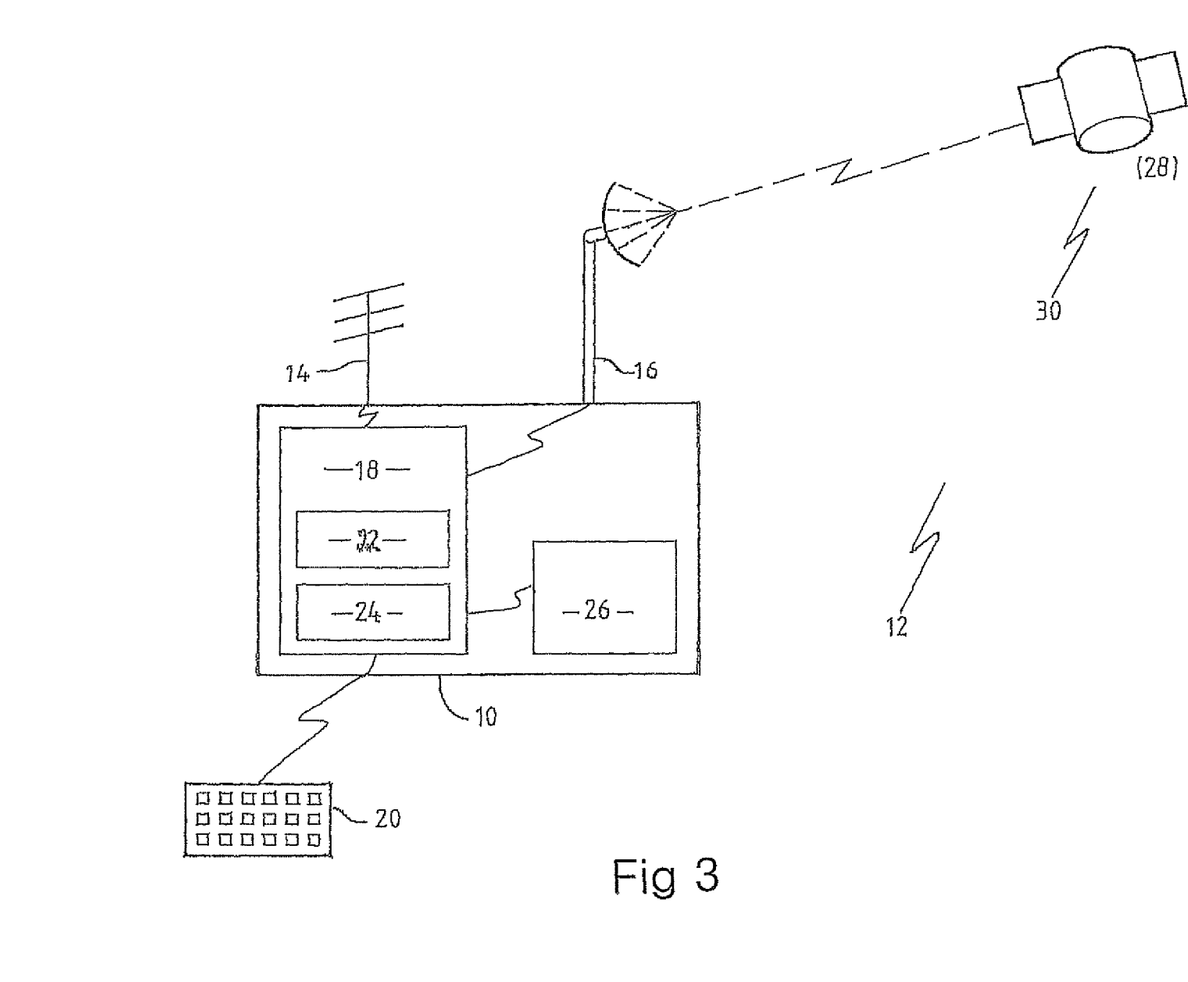
FIG. 3 is a schematic view of a communications network in accordance with a third embodiment of the present invention.

In accordance with a third embodiment of the present invention, where like numerals reference like parts, there is provided a station 10 for use in a HF SSB network 12.

The station 10 comprises a HF transceiver 14 in data and command communication with a GPS receiver 16. Both the transceiver 14 and the GPS receiver 16 are in data and command communication with a microprocessor 18. The microprocessor 18 is also in data communication with a keypad 20.

Microprocessor 18 is pre-programmed with a pseudo-random algorithm 22 and frequency tables 24. The microprocessor 18 is coupled to a system clock 26.

In use, the station 10 operates as follows.

GPS receiver 16 constantly receives a time and position sentence broadcast from a satellite 28 in the GPS network of satellites 30. The time and position sentence is broadcast in digital form. The digital time and position sentence is then communicated to microprocessor 18 for processing. The microprocessor 18 parses the time and position sentence to determine the time of the 1 second timing pulse that immediately precedes the time and position sentence. The rising edge of the 1 second timing pulse is then used to synchronise the system clock 26. Thus, the system clock 26 is calibrated every second to a high degree of accuracy as provided by the satellite 28.

Prior to use, an operator enters in an initial frequency hop code via the keypad 20. The keypad 20 forwards the initial frequency hop code to the microprocessor 20. The microprocessor 20 then operates to seed the pseudo-random algorithm 22 with the initial frequency hop code.

As initial iterations of the pseudo-random algorithm 22 can result in values that are easily determined by an unauthorised party monitoring the HFSSB network 12, the microprocessor 20 performs a predetermined number of iterations of the pseudo-random algorithm 22 at start up. This allows the station 10 to communicate on what is practically a random basis from the very start.

The predetermined number of iterations must be common amongst all stations 10 in the HFSSB network 12 to ensure that communications between stations 10 can occur. If the predetermined number varies, stations 10 will be out of synchronisation with each other.

After performing the initial iterations, additional iterations of the algorithm are then performed to allow each station to synchronise to the same iteration (and thereby the same frequency). The number of iterations to be performed is determined according to the following formula:

$$I = S \times R$$

Where:
I=Number of iterations;
S=Number of seconds elapsed from GMT. This is calculated with reference to the time portion of the of the time and position sentence received by GPS receiver 16; and
R=The frequency hop rate. In this example, the frequency hop rate is set to 5.

Thus, in the current example, the pseudo-random algorithm 22 is required to have at least 432,000 iterations before repeating. While this allows for a pseudo-random algorithm 22 having an order of at least 19 bits to be used, to provide a high level of "randomness" within the pseudo-random algorithm 22, a pseudo-random algorithm 22 having an order of 31 bits is preferred. A further reason for using a pseudo-random algorithm 22 having an order of 31 bits, is that this allows a 10-digit decimal initial frequency hop code to be used.

At midnight GMT time, each station 10 resets itself to the initial frequency hop code. This means that there is no need for stations 10 to track the number of days that have passed for synchronisation purposes.

Once synchronised, iterations of the pseudo-random algorithm then 22 proceed on a normal basis. After a set number of repetitions (equal to the frequency hop rate), the pseudo-random algorithm 22 is resynchronised to conform with the timing pulses of the system clock 26.

On each iteration of the pseudo-random algorithm 22 a frequency control command is forwarded to HF transceiver 14. The frequency control command details the next frequency to hop to and is calculated according tot the following formula:

$$F = Fb + (C \times Fr)/256$$

Where:
F=the frequency to hop to (Hz);
Fb=the start frequency of a hopping band (Hz) currently being used for transmission (see below);
C=the bottom 8 bits of the present value of the pseudo-random algorithm 22; and
Fr=the maximum allowable range of frequency hop (Hz).

The Fb and Fr values are functions of the initial frequency hop code. If the initial frequency hop code begins with a 0 or 1, then a ±2 kHz frequency band is assumed. If the initial frequency hop code begins with a 2, 3 or 4 then a ±16 kHz frequency band is assumed. For all other beginning values of the initial frequency hop code, a ±128 kHz frequency hopping band is assumed. In this manner, stations 10 that use antennas of different selectivity can be used in the HF SSB network 12.

Once the frequency band has been determined, the frequency spectrum (ie from 1.6 MHz to 30 MHz) is divided into hopping bands. Each hopping band is equal in size to the determined frequency band size as determined by the procedure outlined in the previous paragraph. The start frequency of each hopping band is recorded as a lookup table for Fb values. The Fb value for the first frequency to communicate on (ie. the first iteration of pseudo-random algorithm 22) is the start frequency of the hopping band that contains the mid-point of the frequency spectrum, ie. 15.8 MHz).

Upon receiving the frequency control command, the HF transceiver 14 then acts in accordance with the frequency control command to change its transmission and receiving frequency to the calculated frequency. It should be noted that a frequency hop rate of between 5 and 10 times a second is preferable because of the audible noise generated on transfer from one frequency to another. Higher frequency hop rates causes these noises to merge and thereby generate a low hum which can make voice communication between stations 10 difficult to hear.

It should be noted that the initial frequency hop code is distributed to all stations 10 within the HF SSB network 12 by the network control person and can be changed on a daily basis or as required to increase security. In this example, however, it is contemplated that distribution of the initial frequency hop code occurs on a face-to-face basis.

It should be appreciated by the person skilled in the art that the invention is not limited to the embodiments described above. In particular, satellite 28 could be replaced by an airborne vehicle or series of airborne vehicles broadcasting a simple time signal to each station 10 in the HF SSB network 12.

Additionally, the system can be modified to exclude frequency bands in the frequency spectrum used for transmission of television and other telecommunications signals. Such excluded frequency bands need to be common to each station 12 to ensure proper communication. Further, when hopping bands are in use, if any part of a hopping band falls within an excluded frequency band, the excluded frequency band must be relocated such that the lowest frequency of the hopping band is adjacent the highest frequency of the exclusion band.

The invention claimed is:

1. A system for synchronising stations in a wireless communications network comprising:
    at least one airborne or space-based vehicle; and
    at least two stations, each station having receiver means in data communication with the at least one airborne or space-based vehicle and control means in data communication with the receiver means and in control communication with a communication means,
    wherein, when each receiver means receives a synchronisation signal from the at least one airborne or space-based vehicle:
    each receiver means forwards the synchronisation signal to its respective control means;
    each control means processes the synchronisation signal to determine an operational frequency required by its respective communication means to maintain or establish communication with the other station; and
    each control means controls its respective communication means to change to the determined operational frequency,
    the system being characterized in that each station also has a real-time clock for emitting a time pulse, the clock being coupled to the control means of the station, the synchronisation signal comprising a time and position sentence, the control means parses the sentence to determine a time of a timing pulse that immediately precedes the sentence, and in that a rising edge of the timing pulse is used to synchronise the clock.

2. The system for synchronising stations in a wireless communications network according to claim 1, the system being further characterized in that processing of the synchronisation signal includes iterating a pseudo-random algorithm on receipt of the synchronisation signal and determining the operational frequency based on the iterated value of the pseudo-random algorithm.

3. The system for synchronising stations in a wireless communications network according to claim 2, the system being further characterized in that a frequency range of each communication means is determined from at least a part of an initial code, the initial code being an initial value of the pseudo-random algorithm.

4. The system for synchronising stations in a wireless communications network according to claim 3, the system being further characterized in that an operable frequency spectrum of each communication means is divided into a set of hopping bands, a start frequency of each hopping band being stored in a reference table.

5. The system for synchronising stations in a wireless communications network according to claim 4, the system being further characterized in that processing of the synchronisation signal includes iterating a pseudo-random algorithm on receipt of the synchronisation signal and determining the operational frequency based on the iterated value of the pseudo-random algorithm, wherein a frequency range of each communication means is determined from at least part of an initial code, the initial code being the initial value of the pseudo-random algorithm, and wherein each hopping band has a range equal to the determined frequency range.

6. The system for synchronising stations in a wireless communications network according to claim 4, the system being further characterized in that the operational frequency required by the communication means to maintain or establish communication with the other station is determined according to the formula:

$$F = Fb + (C \times Fr)/Y$$

wherein:
    F=the operational frequency
    Fb=the start frequency of the hopping band currently being used for transmission, as determined by values stored in the reference table;
    C=a present value of the pseudo-random algorithm, or a part thereof;
    Fr=a maximum allowable range of frequency hop in Hz; and
    $Y = 2^{(\text{the number of bits used by } C)}$.

7. The system for synchronising stations in a wireless communications network according to claim 6, the system being further characterized in that Y=256.

8. The system for synchronising stations in a wireless communications network according to claim 4, the system being further characterized in that the control means operates to avoid determining an operational frequency falling within at least one predetermined hopping band.

9. The system for synchronising stations in a wireless communications network according to claim 4, each hopping band has a range equal to the determined frequency range.

10. The system for synchronising stations in a wireless communications network according to claim 2, the system being further characterized in that the iterated value of the pseudo-random algorithm is cross-referenced with a frequency table to determine the operational frequency required to maintain or establish communication with the other station.

11. The system for synchronising stations in a wireless communications network according to claim 2, the system being further characterized in that the pseudo-random algorithm is iterated on receipt of each time pulse.

12. The system for synchronising stations in a wireless communications network according to claim 11, the system being further characterized in that the real-time clock emits a predetermined number of time pulses (R) a second.

13. The system for synchronising stations in a wireless communications network according to claim 12, the system being further characterized in that R is in the range 5 [R [10.

14. The system for synchronising stations in a wireless communications network according to claim 13, the system being further characterized in that R=5.

15. The system for synchronising stations in a wireless communications network according to claim 12, the system being further characterized in that when a new station joins the communications network, synchronisation of the new station with existing stations is attained by setting the value of the pseudo-random algorithm to an initial code and iterating the pseudo-random algorithm according to the formula:

$$I = S \times R$$

wherein:
I=number of iterations of the pseudo-random algorithm to be performed;
S=number of seconds that have passed since a predetermined amount of time elapsed; and
R=the predetermined number of time pulses a second.

16. The system for synchronising stations in a wireless communications network according to claim 12, the system being further characterized in that the pseudo-random algorithm performs at least 86400×R iterations before repeating.

17. The system for synchronising stations in a wireless communications network according to claim 2, the system being further characterized in that after a predetermined amount of time the pseudo-random algorithm resets its value to equal an initial code, the initial code being an initial value of the pseudo-random algorithm.

18. The system for synchronising stations in a wireless communications network according to claim 17, the system being further characterized in that the predetermined amount of time is 24 hours.

19. The system for synchronising stations in a wireless communications network according to claim 2, the system being further characterized in that the pseudo-random algorithm is at least a 31 bit algorithm.

20. The system for synchronising stations in a wireless communications network according to claim 2, the system being further characterized in that when the pseudo-random algorithm has a value equal to an initial code, the initial code being an initial value of the pseudo-random algorithm, the control means operates to iterate the pseudo-random algorithm a predetermined number of times.

21. The system for synchronising stations in a wireless communications network according to claim 2, the system being further characterized in that the pseudo-random algorithm is based on the Digital Encryption Standard algorithm.

22. The system for synchronising stations in a wireless communications network according to claim 2, the system being further characterized in that each station includes a data input means, data input using the data input means being operable to seed the pseudo-random algorithm with an initial value.

23. The system for synchronising stations in a wireless communications network according to claim 1, the system being further characterized in that time information is cross-referenced with a frequency table to determine the operational frequency required to maintain or establish communication with the other station.

24. The system for synchronising stations in a wireless communications network according to claim 1, the system being further characterized in that the communication means is a transceiver.

25. The system for synchronising stations in a wireless communications network according to claim 1, the system being further characterized in that the communication means of at least one station is a transmitter or transceiver and the communication means of at least one station is a receiver.

26. The system for synchronising stations in a wireless communications network according to claim 1, the system being further characterized in that the at least one airborne or space-based vehicle comprises the global positioning system network of satellites.

27. The system for synchronising stations in a wireless communications network according to claim 1, the system being further characterized in that the at least one airborne or space-based vehicle comprises a geosynchronous satellite.

28. The system for synchronising stations in a wireless communications network according to claim 1, the system being further characterized in that each station also has a unique identification code and wherein, when one station, a calling station, communicates with another station, a receiving station:
the calling station transmits a communication message including the unique identification codes of the calling station and receiving station on each frequency in a predetermined set of frequencies, commencing with the operational frequency;
the receiving station records a value of at least one attribute in respect of a transmission signal encapsulating the communication message for each frequency in the predetermined set of frequencies;
the receiving station sends a reply communication message including the unique identification codes of the calling station and receiving station on the frequency having the best recorded value or best combination of recorded values; and
the calling station scans each frequency in the predetermined set of frequencies until the frequency on which the reply communication message has been sent is received,
communications between calling station and receiving station thereafter continuing on that frequency.

29. The system for synchronising stations in a wireless communications network according to claim 28, the system being further characterized in that the calling station transmits a communication message including the unique identification codes of the calling station and receiving station on each frequency in a predetermined set of frequencies twice and where the receiving station records the best value of the at least one attribute in respect of the two transmission signals encapsulating the communication message for each frequency in the predetermined set of frequencies.

30. The system for synchronising stations in a wireless communications network according to claim 28, the system being further characterized in that the at least one attribute includes at least one of the following: signal strength; bit error rate.

31. A station for use in a system for synchronising stations in a wireless communications, comprising:
at least one airborne or space-based vehicle; and
at least two of the stations, each station having receiver means in data communication with the at least one airborne or space-based vehicle, and control means in data communication with the receiver means and in control communication with a communication means;
wherein, when each receiver means receives a synchronisation signal from the at least one airborne or space-based vehicle:
each receiver means forwards the synchronisation signal to its respective control means;
each control means processes the synchronisation signal to determine an operational frequency required by its respective communication means to maintain or establish communications with another station; and
each control means controls its respective communication means to change to the determined operational frequency,
the system being characterised in that each station also has a real-time clock for emitting a time pulse, the clock being coupled to the control means of the station, the synchronisation signal comprising a time and position sentence, the control means parses the sentence to determine a time of a timing pulse that immediately precedes the sentence, and in that a rising edge of the timing pulse is used to synchronise the clock.

32. A method of synchronising stations in a wireless communications network, the method comprising:
   receiving, at each station of the communications network, a synchronisation signal from at least one airborne or space-based vehicle;
   processing the synchronisation signal to determine an operational frequency required by a communication means of each station to maintain or establish communication with another station; and
   changing a frequency of the communication means to communicate on the operational frequency,
   the method being characterised in that a control means of each station parses a time and position sentence of the synchronisation signal to determine a time of a timing pulse that immediately precedes the sentence, and in that a rising edge of the timing pulse is used to synchronise a real-time clock of each station, the clock being for emitting a time pulse, and the clock being coupled to the control means of the station.

33. The method of synchronising stations in a wireless communications network according to claim 32, the method being further characterized in that it includes the step of iterating a pseudo-random algorithm on receipt of the synchronisation signal, and in that the step of processing the synchronisation signal determines the operational frequency based on the iterated value of the pseudo-random algorithm.

34. The method of synchronising stations in a wireless communications network according to claim 33, the method being further characterized in that it includes the step of determining a frequency range for the communication means from at least a part of an initial code, the initial code being an initial value of the pseudo-random algorithm.

35. The method of synchronising stations in a wireless communications network according to claim 34, the method being further characterized in that it includes the steps of dividing an operable frequency spectrum of each communication means into a set of hopping bands and storing a start frequency of each hopping band in a reference table.

36. The method of synchronising stations in a wireless communications network according to claim 35, the method being further characterized in that it includes the steps of iterating a pseudo-random algorithm on receipt of the synchronisation signal wherein the step of processing the synchronisation signal determines the operational frequency based on the iterated value of the pseudo-random algorithm; and determining a frequency range for the communication means from at least a part of an initial code, the initial code being the initial value of the pseudo-random algorithm, wherein the step of dividing the operable frequency spectrum into a set of hopping bands involves dividing the operable frequency spectrum into a set of hopping bands each having a range equal to the determined frequency range.

37. The method of synchronising stations in a wireless communications network according to claim 35, the method being further characterized in that the step of determining the operational frequency is determined according to the formula:

$$F=Fb+(C \times Fr)/Y$$

wherein:
   F=the operational frequency
   Fb=the start frequency of the hopping band currently being used for transmission, as determined by values stored in the reference table;
   C=a present value of the pseudo-random algorithm, or a part thereof;
   Fr=a maximum allowable range of frequency hop in Hz; and
   $Y=2^{(\text{the number of bits used by } C)}$.

38. The method of synchronising stations in a wireless communications network according to claim 35, the method being further characterized in that it includes the step of avoiding determining an operational frequency falling within at least one predetermined hopping band.

39. The method of synchronising stations in a wireless communications network according to claim 35, the method being further characterised in that the step of dividing the operable frequency spectrum into a set of hopping bands involves dividing the operable frequency spectrum into a set of hopping bands having a range equal to the determined frequency range.

40. The method of synchronising stations in a wireless communications network according to claim 33, the method being further characterized in that the step of determining the operational frequency includes the sub-step of cross-referencing the iterated value of the pseudo-random algorithm with a frequency table.

41. The method of synchronising stations in a wireless communications network according to claim 33, the method being further characterized in that it includes the step of iterating the pseudo-random algorithm on receipt of the time pulse emitted by the real time clock.

42. The method of synchronising stations in a wireless communications network according to claim 41, the method being further characterized in that it includes the step of emitting a predetermined number of time pulses (R) a second.

43. The method of synchronising stations in a wireless communications network according to claim 42, the method being further characterized in that R is in the range $5 \leq R \leq 10$.

44. The method of synchronising stations in a wireless communications network according to claim 43, the method being further characterized in that R=5.

45. The method of synchronising stations in a wireless communications network according to claim 33, the method being further characterized in that it includes the step of synchronising a new station with existing stations in the communications network by setting the value of the pseudo-random algorithm to an initial code and iterating the pseudo-random algorithm according to the formula:

$$I=S \times R$$

wherein:
   I=number of iterations of the pseudo-random algorithm to be performed;
   S=number of seconds that have passed since a predetermined amount of time elapsed; and
   R=the predetermined number of time pulses a second.

46. The method of synchronising stations in a wireless communications network according to claim 33, the method being further characterized in that it includes the step of resetting the value of the pseudo-random algorithm to equal an initial code, the initial code being the initial value of the pseudo-random algorithm, after a predetermined amount of time.

47. The method of synchronising stations in a wireless communications network according to claim 46, the method being further characterized in that the predetermined amount of time is 24 hours.

48. The method of synchronising stations in a wireless communications network according to claim 33, the method being further characterized in that it includes the step of iterating the pseudo-random algorithm a predetermined number of times when the pseudo-random algorithm has a value equal to an initial code, the initial code being an initial value of the pseudo-random algorithm.

49. The method of synchronising stations in a wireless communications network according to claim 33, the method being further characterized in that it includes the step of seeding the pseudo-random algorithm with an initial value using data input means.

50. The method of synchronising stations in a wireless communications network according to claim 32, the method being further characterized in that the step of determining the operational frequency includes the sub-step of cross-referencing time information included in the time and position sentence with a frequency table.

51. The method of synchronising stations in a wireless communications network according to claim 32, the method being further characterized in that it includes the steps of:
- transmitting a communication message including a unique identification code of a calling station and of a receiving station on each frequency in a predetermined set of frequency frequencies, commencing with the operational frequency;
- scanning each frequency in the predetermined set of frequencies for a reply communication message including the unique identification codes of the calling station and receiving station;
- receiving the reply communication message on a frequency having the best recorded value or best combination of recorded values, as determined by a value recorded by the receiving station of at least one attribute in respect of a transmission signal encapsulating the communication message for each frequency in the predetermined set of frequencies; and
- communicating with the receiving station on the frequency having the best recorded value or best combination of recorded values.

52. The method of synchronising stations in a wireless communications network according to claim 51, the method being further characterized in that the step of transmitting a communication message including a unique identification code of a calling station and of a receiving station on each frequency in a predetermined set of frequencies, commencing with the operational frequency, is repeated twice.

53. The method of synchronising stations in a wireless communications network according to claim 51, the method being further characterized in that the at least one attribute includes at least one of the following: signal strength; bit error rate.

54. The method of synchronising stations in a wireless communications network according to claim 32, the method being further characterized in that it includes the steps of:
- receiving a communication message including a unique identification code of a calling station and of a receiving station on each frequency in a predetermined set of frequencies, commencing with the operational frequency;
- recording a value of at least one attribute in respect of a transmission signal encapsulating the communication message for each frequency in the predetermined set of frequencies;
- sending a reply communication message including the unique identification codes of the calling station and receiving station on the frequency having the best recorded value or best combination of recorded values; and
- communicating with the calling station on the frequency having the best recorded value or best combination of recorded values.

55. The method of synchronising stations in a wireless communications network according to claim 54, the method being further characterized in that the step of receiving a communication message including a unique identification code of a calling station and of a receiving station on each frequency in a predetermined set of frequencies, commencing with the operational frequency, is repeated twice, and in that the step of recording a value of at least one attribute in respect of the transmission signal encapsulating the communication message for each frequency in the predetermined set of frequencies operates to record the best of the two values.

56. The method of synchronising stations in a wireless communications network according to claim 55, the method being further characterized in that the at least one attribute includes at least one of the following: signal strength; bit error rate.

* * * * *

UNITED STATES PATENT AND TRADEMARK OFFICE
CERTIFICATE OF CORRECTION

| | | Page 1 of 1 |
|---|---|---|
| PATENT NO. | : 8,488,518 B2 | |
| APPLICATION NO. | : 10/567110 | |
| DATED | : July 16, 2013 | |
| INVENTOR(S) | : Phillip Bradshaw | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2,218 days.

Signed and Sealed this
Ninth Day of June, 2015

Michelle K. Lee
*Director of the United States Patent and Trademark Office*